United States Patent
Yang et al.

(10) Patent No.: US 6,214,279 B1
(45) Date of Patent: Apr. 10, 2001

(54) APPARATUS AND PROCESS FOR FREEFORM FABRICATION OF COMPOSITE REINFORCEMENT PREFORMS

(75) Inventors: Junsheng Yang; Liangwei Wu; Junhai Liu; Bor Z. Jang, all of Auburn, AL (US)

(73) Assignee: Nanotek Instruments, Inc., Opelika, AL (US)

( * ) Notice: Subject to any disclaimer, the term of this patent is extended or adjusted under 35 U.S.C. 154(b) by 0 days.

(21) Appl. No.: 09/410,913

(22) Filed: Oct. 2, 1999

(51) Int. Cl.[7] .......................... B29C 41/02; B29C 41/52; G06F 17/50; G06F 19/00
(52) U.S. Cl. .................. 264/482; 264/40.1; 264/308; 264/483; 264/485; 264/488; 264/489; 264/492; 264/494; 347/1; 425/135; 425/141; 425/145; 425/375; 700/119
(58) Field of Search .................. 264/40.1, 308, 264/401, 482, 483, 485, 488, 489, 492, 494; 425/135, 141, 145, 375; 347/1; 700/119

(56) References Cited

U.S. PATENT DOCUMENTS

| | | |
|---|---|---|
| 4,141,948 | 2/1979 | Laskow et al. . |
| 4,320,079 | 3/1982 | Minnear et al. . |
| 4,549,191 | 10/1985 | Fukachi et al. . |
| 4,571,599 | 2/1986 | Rezanka . |
| 4,659,610 | 4/1987 | George et al. . |
| 4,665,492 * | 5/1987 | Masters ............................... 700/119 |
| 4,749,347 | 6/1988 | Valavaara . |
| 4,863,538 | 9/1989 | Deckard . |
| 4,887,100 | 12/1989 | Michaelis et al. . |
| 4,902,326 | 2/1990 | Jarmon . |
| 5,121,329 | 6/1992 | Crump . |
| 5,134,569 | 7/1992 | Masters . |
| 5,204,055 | 4/1993 | Sachs et al. . |
| 5,301,863 | 4/1994 | Prinz et al. . |
| 5,303,141 | 4/1994 | Batchelder et al. . |
| 5,346,774 | 9/1994 | Burgess . |

(List continued on next page.)

OTHER PUBLICATIONS

D. Klosterman, et al., in Proceedings of the 7th International Conference on Rapid Prototyping—1997, Mar. 31–Apr. 3, 1997, San Francisco, CA, ed. By R. P. Chartoff, et al., pp. 43–50 and pp. 283–292.

*Primary Examiner*—Leo B. Tentoni

(57) ABSTRACT

A solid freeform fabrication process and apparatus for making a three-dimensional reinforcement shape. The process comprises the steps of (1) operating a multiple-channel material deposition device for dispensing a liquid adhesive composition and selected reinforcement materials at predetermined proportions onto a work surface; (2) during the material deposition process, moving the deposition device and the work surface relative to each other in an X-Y plane defined by first and second directions and in a Z direction orthogonal to the X-Y plane so that the materials are deposited to form a first layer of the shape; (3) repeating these steps to deposit multiple layers for forming a three-dimensional preform shape; and (4) periodically hardening the adhesive to rigidize individual layers of the preform. These steps are preferably executed under the control of a computer system by taking additional steps of (5) creating a geometry of the shape on the computer with the geometry including a plurality of segments defining the preform shape and each segment being preferably coded with a reinforcement composition defining a specific proportion of different reinforcement materials; (6) generating programmed signals corresponding to each of the segments in a predetermined sequence; and (7) moving the deposition device and the work surface relative to each other in response to these programmed signals. Preferably, the system is also operated to generate a support structure for any un-supported feature of the 3-D preform shape.

29 Claims, 8 Drawing Sheets

U.S. PATENT DOCUMENTS

| | | |
|---|---|---|
| 5,350,545 | 9/1994 | Streckert et al. . |
| 5,387,380 * | 2/1995 | Cima et al. .................. 264/308 X |
| 5,402,351 | 3/1995 | Batchelder et al. . |
| 5,456,981 | 10/1995 | Olry et al. . |
| 5,514,232 | 5/1996 | Burns . |
| 5,529,620 | 6/1996 | Gorbett et al. . |
| 5,571,628 | 11/1996 | Hackman . |
| 5,705,008 | 1/1998 | Hecht . |
| 5,738,817 | 4/1998 | Danforth et al. . |

* cited by examiner

APPARATUS AND PROCESS FOR FREEFORM FABRICATION OF COMPOSITE REINFORCEMENT PREFORMS

This application is based in part on the results of a research project sponsored by the U.S. NASA Johnson Space Center. The U.S. government has certain rights on this invention.

FIELD OF THE INVENTION

This invention relates generally to a computer-controlled process and apparatus for fabricating reinforcement preforms for composite parts and, in particular, to an improved process and apparatus for building a three-dimensional composite preform in a layer-by-layer fashion.

BACKGROUND OF THE INVENTION

The process of liquid composite molding (LCM), including resin transfer molding, to produce structural composites has gained considerable attention over the last decade. One barrier to the process gaining further acceptance has been the lack of adequate knowledge and expertise in the cost-effective production of reinforcement preforms. If the LCM process is to remain economically viable, low-cost methods of preform production must be further advanced. At present, two basic input forms of fiberglass are available to the LCM molder for producing a stiff three-dimensional (3-D) preform: a thermoformable continuous strand mat and a multi-end roving.

Three basic routes are available for fabricating LCM preforms from the two basic input forms of reinforcement (mats and rovings). These are cut-and-sew preforming, directed fiber spray-up, and stamping of thermoformed mats. Cut-and-sew preforming is utilized in aerospace and low-volume applications. In a cut-and-sew preform, areas of material are defined based on the requirements determined in a finite element analysis. In this process, the general size and shape of each area is cut from a conformable material and fit to the part mold or a part model; this is then cut, trimmed and sewn to fit the desired dimensions. A final template is built and the actual reinforcement is cut and sewed on the preform. This process is slow and labor intensive.

The directed fiber spray-up process utilizes an air-assisted chopper/binder gun which conveys glass and binder to a perforated metal screen shaped identical to the part to be molded. The chopped fibers are held in place on the screen by a large blower drawing air through the screen. Once the desired thickness of reinforcement has been achieved, the chopping system is turned off and the preform is formed by polymerizing or curing the binder. Once stabilized, the preform is cooled and removed from the screen. A pre-shaped screen or perforated mold is required in this process.

The thermoformed mat process requires an oven to heat the mat, a frame to hold it while being stretched into shape, and a tool to form the mat into a preform. In a typical process, several plies of mat would be cut to the approximate desired shape of the molded part, allowing extra material to be held in a frame. The frame containing the material is then placed in an oven to be heated (up to 170° C.) and then quickly transferred to the forming tool. The tool is closed, forming and cooling the mat for a short period of time. After removing the frame and trimming the waste fibers clamped in the frame, the preform is ready for molding. Both thermoplastic and thermoset binder systems are available to retain the formed shape. Again, a pre-shaped tool or mold is required in this process.

The preparation of fiber preforms for metal matrix composites (MMCs) or ceramic matrix composites (CMCs) is often accomplished by machining blocks or sheets of fibers (e.g., preforms used in U.S. Pat. No. 4,141,948, Feb. 27, 1979 to W. Laskow and C. Morelock). A preform can also be made by pouring a curable mixture of carbon fiber and binder into a mold, followed by the removal of excess binder by the application of reduced pressure or vacuum pumping (e.g., U.S. Pat. No. 4,320,079, Mar. 16, 1982 to W. Minnear and W. Morrison). In a similar approach, a fiber preform precursor is impregnated with a colloidal suspension of inorganic material. This impregnated preform precursor is cooled to precipitate the inorganic material from the suspension and then dried to form a rigidized fiber preform (U.S. Pat. No. 4,902,326, Feb 20, 1990 to D. Jarmon). Other methods of making composite preforms may be found in the following U.S. Patents: U.S. Pat. Nos. 5,346,774 (Sep. 13, 1994 to K. Burgess), U.S. Pat. No. 5,350,545 (Sep. 27, 1994 to H. Streckert, et al.), U.S. Pat. No. 5,456,981 (Oct. 10, 1995 to P. Olry, et al.), U.S. Pat. No. 5,571,628 (Nov. 5, 1996 to L. Hackman), U.S. Pat. No. 5,529,620 (Jun. 25, 1996 to W. Gorbett, et al.), U.S. Pat. No. 5,705,008 (Jan. 6, 1998 to D. Hecht), and U.S. Pat. No. 4,659,610 (Apr. 21, 1987 to S. George, et al.). A common shortcoming of these preform making methods is the need to have a pre-shaped mold or tool against which a preform structure of a desired shape is made. Otherwise, the preform must be made into a larger-than-necessary shape and then machined down to the desired shape.

Solid freeform fabrication (SFF) or layer manufacturing (LM) is a new fabrication technology that builds an object of any complex shape layer by layer or point by point without using a pre-shaped tool (die or mold). This process begins with creating a Computer Aided Design (CAD) file to represent the geometry or drawing of a desired object. As a common practice, this CAD file is converted to a stereo lithography (.STL) format in which the exterior and interior surfaces of the object is approximated by a large number of triangular facets that are connected in a vertex-to-vertex manner. A triangular facet is represented by three vertex points each having three coordinate points: $(x_1,y_1,z_1)$, $(x_2,y_2,z_2)$, and $(x_3, y_3,z_3)$. A perpendicular unit vector $(i,j,k)$ is also attached to each triangular facet to represent its normal for helping to differentiate between an exterior and an interior surface. This object image file is further sliced into a large number of thin layers with the contours of each layer being defined by a plurality of line segments connected to form polylines. The layer data are converted to tool path data normally in terms of computer numerical control (CNC) codes such as G-codes and M-codes. These codes are then utilized to drive a fabrication tool for building an object layer by layer.

This SFF technology enables direct translation of the CAD image data into a three-dimensional (3-D) object. The technology has enjoyed a broad array of applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs. The potential of adapting SFF technology for the preparation of reinforcement preforms from fibers and/or particulates for composite applications has been largely ignored.

The SFF techniques that potentially can be used to fabricate short fiber- or particulate-reinforced composite parts or their precursor preforms include fused deposition modeling (FDM), laminated object manufacturing (LOM) or related lamination-based process, and powder-dispensing techniques. The FDM process (e.g., U.S. Pat. No. 5,121,329; 1992 to S. S. Crump) operates by employing a heated nozzle to melt and extrude out a material such as nylon, ABS plastic (acrylonitrile-butadiene-styrene) and wax in the form of a rod or filament. The filament or rod is introduced into a channel of a nozzle inside which the rod/filament is driven by a motor and associated rollers to move like a piston. The front end, near a nozzle tip, of this piston is heated to become melted; the rear end or solid portion of this piston pushes the melted portion forward to exit through the nozzle tip. The nozzle is translated under the control of a computer system in accordance with previously sliced CAD data to trace out a 3-D object point by point and layer by layer. In principle, the filament may be composed of a fiber or particulate reinforcement dispersed in a matrix (e.g., a thermoplastic such as nylon). In this case, the resulting object would be a short fiber composite or particulate composite. The FDM method has been hitherto limited to low melting materials such as thermoplastics and wax and has not been practiced for preparation of metallic parts, possibly due to the difficulty in incorporating a high temperature nozzle in the FDM system.

A more recent patent (U.S. Pat. No. 5,738,817, April 1998, to Danforth, et al.) reveals a FDM process for forming 3-D solid objects from a mixture of a particulate composition dispersed in a binder. The method involves additional operations of preparing a mixture of particles and binder and forming the mixture into a filament or rod form. The mixture in this filament or rod form is then introduced into a nozzle with the leading portion of the filament/rod melted and extruded to deposit onto a work surface point by point and layer by layer for forming a 3-D shape. The binder in this 3-D shape is later burned off with the remaining particulate composition densified by re-impregnation or high-temperature sintering. A large amount of binder, up to 60–80% by volume, must be burned off and this represents a significant waste of material and requires a long duration of time to accomplish.

Other melt extrusion-type processes include those disclosed in Valavaara (U.S. Pat. No. 4,749,347, June 1988), Masters (U.S. Pat. No. 5,134,569, July 1992), and Batchelder, et al. (U.S. Pat. No. 5,402,351, 1995 and U.S. Pat. No. 5,303,141, 1994). These melt extrusion based deposition systems, if adapted for forming short fiber or particulate composite object would suffer from the same shortcomings as in FDM. Furthermore, the incorporation of 20–40% short fibers or particulates in a matrix melt would further increase the viscosity of the material in a flow channel, making it more difficult to operate the FDM or related extrusion-based process.

In a series of U.S. Patents (e.g., U.S. Pat. No. 5,204,055, April 1993), Sachs, et al. disclose a 3-D powder printing technique that involves using an ink jet to spray a computer-defined pattern of liquid binder onto a layer of uniform-composition powder. The binder serves to bond together those powder particles on those areas defined by this pattern. Those powder particles in the un-wanted regions remain loose or separated from one another and are removed at the end of the build process. Another layer of powder is spread over the preceding one, and the process is repeated. The "green" part made up of those bonded powder particles is separated from the loose powder when the process is completed. This procedure is followed by binder removal and metal melt impregnation or sintering. This technique is limited to one type of powder particles in one layer and is useful for fabricating uniform-composition material only. The technique does not lend itself for varying the powder composition from point to point for the preparation of heterogeneous materials.

This same drawback is true of the selected laser sintering or SLS technique (e.g., U.S. Pat. No. 4,863,538, Sep. 5, 1989 to C. Deckard) that involves spreading a full-layer of powder particles and uses a computer-controlled, high-power laser to partially melt these particles at desired spots. Commonly used powders include thermoplastic particles or thermoplastic-coated metal and ceramic particles. The procedures are repeated for subsequent layers, one layer at a time, according to the CAD data of the sliced-part geometry. The loose powder particles in each layer are allowed to stay as part of a support structure. The sintering process does not always fully melt the powder, but allows molten material to bridge between particles. Commercially available systems based on SLS are known to have several drawbacks. One problem is that long times are required to heat up and cool down the material chamber after building. In addition, the process has not been successfully applied to fabrication of fiber composite parts.

Most of other prior-art layer manufacturing techniques also have been largely limited to producing parts with homogeneous material compositions. Furthermore, due to the specific solidification mechanisms employed, many other LM techniques are limited to producing parts from specific polymers. For instance, Stereo Lithography and Solid Ground Curing (SGC) rely on ultraviolet (UV) light induced curing of photo-curable polymers such as acrylate and epoxy resins. Additionally, most of the current RP systems are not effective in adding fibers into a RP material or varying the fiber type of a composite object from layer to layer and from spot to spot.

Modified laminated object manufacturing (LOM) has been used to prepare polymer matrix and ceramic matrix composites (D. Klosterman, et al, in Proceedings of The $7^{th}$ International Conference on Rapid Prototyping—1997, Mar. 31–Apr. 3, 1997, San Francisco, Calif., USA, ed. By R. P. Chartoff, et al.; pp.43–50 and pp. 283–292). The process involves, for instance, feeding, laminating and cutting thin sheets of prepregs (pre-impregnated fiber preform) in a layer-by-layer fashion according to computer-sliced layer data representing cross sectional layers of a 3-D object. The process cycle typically consists of laminating a single sheet of prepreg to an existing stack, laser cutting the perimeter of the part cross section, and laser-dicing or "cubing" the waste material. After all layers have been completed, the part block is removed from the platform, and the excess material is removed to reveal the 3-D object. This process results in large quantities of expensive prepreg materials being wasted.

In U.S. Pat. No. 5,514,232, issued May 7, 1996, Burns discloses a method and apparatus for automatic fabrication of a 3-D object from individual layers of fabrication material having a predetermined configuration. Each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not fully consolidated layer from one station to another would tend to shift the layer position and distort the layer shape. The removal of individual layers from their substrate also tends to inflict changes in layer shape and position with respect to a previous layer, leading to inaccuracy in the resulting part.

In U.S. Pat. No. 5,301,863 issued on Apr. 12, 1994, Prinz and Weiss disclose a Shape Deposition Manufacturing (SDM) system. The system contains a material deposition station and a plurality of processing stations (for mask making, heat treating, packaging, complementary material deposition, shot peening, cleaning, shaping, sand-blasting, and inspection). Each processing station performs a separate function such that when the functions are performed in series, a layer of an object is produced and is prepared for the deposition of the next layer. This system requires an article transfer apparatus, a robot arm, to repetitively move the object-supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process necessarily makes the over-all fabrication equipment bulky, heavy, expensive, and difficult to maintain. The equipment also requires attended operation.

Therefore, an object of the present invention is to provide an improved layer-additive process and apparatus for producing a 3-D reinforcement preform shape to be used for making a composite material part.

Another object of the present invention is to provide a computer-controlled process and apparatus for producing a multi-material preform shape, for use in a 3-D composite part, on a layer-by-layer basis.

It is a further object of this invention to provide a computer-controlled composite preform-building process that does not require heavy and expensive equipment.

It is another object of this invention to provide a process and apparatus for building a CAD-defined object in which the reinforcement composition pattern can be predetermined.

Still another object of this invention is to provide a layer manufacturing technique that places minimal constraint on the range of reinforcement materials that can be used in the fabrication of a 3-D composite object.

SUMMARY OF THE INVENTION

The Process

The objects of the invention are realized by a process and related apparatus for fabricating a three-dimensional preform shape on a layer-by-layer basis. Basically, the process comprises deposition of a hardenable or curable liquid adhesive composition and solid reinforcement materials (fibers, particulates, platelets, whiskers, etc.) at predetermined proportions to build a 3-D shape, preferably under the control of a CAD computer. Both liquid adhesive and solid reinforcement compositions can be selected from a wide range of materials.

One embodiment of the present invention is a process for building a 3-D object in a layer-by-layer fashion. The process comprises the steps of:

(a) operating a material deposition device which comprises (1) a liquid adhesive dispensing tool and (2) a reinforcement dispensing tool to deposit solid reinforcement elements (particles, fibers, etc.) so that the deposited individual elements are bonded together at points of contact between elements;

(b) providing an object-supporting work surface (or platform) at a predetermined initial distance from (but in a close working vicinity of) the material deposition device to receive the liquid adhesive and solid reinforcement elements therefrom; and (c) during the material dispensing procedure, moving the material deposition device and the work surface relative to each other in an X-Y plane defined by first (X-) and second (Y-) directions and in a third (Z-) direction orthogonal to this X-Y plane to form the reinforcement elements and adhesive (collectively referred to as deposition materials) into a three dimensional preform shape. Liquid adhesive may be periodically subjected to a curing, evaporation, or solidification treatment, during any selected stage of or after the dispensing procedure, to harden the adhesive, thereby rigidizing the preform shape.

The reinforcement dispensing tool preferably is of multiple-channel type being capable of dispensing reinforcements of variable compositions. The adhesive can be dispensed from a single-channel or multiple-channel dispensing tool.

In another embodiment, a process is disclosed which comprises the above three steps, (a) through (c), wherein the moving step includes the steps of (i) moving the deposition device and the work surface relative to each other in a direction parallel to the X-Y plane to form a first layer of the deposition materials on the work surface; (ii) moving the deposition device and the work surface away from one another by a predetermined layer thickness; and (iii) after the portion of the first layer adjacent to the nozzles of the deposition device has hardened, dispensing a second layer of the deposition materials onto the first layer while simultaneously moving the work surface and the deposition device relative to each other in a direction parallel to the X-Y plane, whereby the liquid adhesive in the second layer hardens and helps to bond the two neighboring layers together.

In yet another embodiment, a process is disclosed which comprises the above steps, (a) through (c) including (i) through (iii), and additional steps of (d) forming multiple layers of the deposition materials on top of one another by repeated dispensing of the liquid adhesive and reinforcement elements from the deposition device as the work surface and the deposition device are moved relative to each other in a direction parallel to the X-Y plane, with the deposition device and the work surface being moved away from one another in the Z-direction by a predetermined layer thickness after each preceding layer has been formed, and with the dispensing of each successive layer being controlled to take place after the liquid adhesive in the preceding layer immediately adjacent the deposition sub-system has substantially hardened.

As a further preferred embodiment, the above cited steps (a) through (c) are further combined with the steps of (e) creating a geometry of the three-dimensional preform shape on a computer with the geometry including a plurality of segments defining the object; (f) generating programmed signals corresponding to each of the segments in a predetermined sequence; and (g) moving the deposition device and the work surface relative to each other in response to the programmed signals. To build a multi-reinforcement preform shape, each segment is preferably attached with a reinforcement code that can be converted to programmed signals for activating the dispensing of selected reinforcement compositions to form the desired reinforcement dispersion pattern of the finished shape. Further preferably, the supporting software programs in the computer comprise means for evaluating the CAD data files of the preform shape to locate any un-supported feature of the shape and means for defining a support structure for the un-supported feature. The software is also capable of creating a plurality of segments defining the support structure and generating programmed signals required by the same deposition device or a separate fabrication tool (e.g., a wax dispensing gun) to fabricate the support structure.

One may choose to dispense any selected layer of reinforcement/adhesive material initially to a larger-than-necessary height and then compress the layer down to approximately the final desired thickness. This desired thickness can be preserved by hardening the adhesive to a proper extent prior to removal of the compression force. This approach serves to increase the reinforcement content of this selected layer (leaving behind less space for impregnation by a matrix material at a later time) if deemed necessary.

The Apparatus

Another embodiment of this invention is an apparatus comprising a material deposition device, an object-supporting work surface, and motion devices. The material deposition device is composed of two major components: a liquid adhesive dispensing tool and a reinforcement dispensing device. The liquid adhesive dispensing tool comprises (1) a flow channel being supplied with a hardenable liquid composition, (2) one nozzle having a fluid passage in flow communication with the corresponding channel and a discharge orifice, and (3) actuator means located in control relation to the channel for activating the dispensing of liquid through the discharge orifice. The reinforcement dispensing tool comprises (1) at least a flow channel being supplied with solid reinforcement elements (short fibers, long fibers, whiskers, and particulates of various shapes such as spherical particles, ellipsoid particles, flakes, platelets, small ribbons, discs, etc.), (2) for each flow channel, at least one nozzle having a flow passage in flow communication with the flow channel and a discharge orifice, and (3) valve means located in control relation with corresponding flow channel.

The object-supporting work surface or platform is generally flat and is located at a predetermined initial distance from (but in close, working proximity to) the discharge orifices of the deposition device to receive discharged materials therefrom. The motion devices are coupled to the work surface and the material deposition device for moving the deposition device and the work surface relative to each other in an X-Y plane defined by first and second directions (X- and Y-directions) and in a third direction (Z-direction)) orthogonal to the X-Y plane to deposit the liquid adhesive and/or solid reinforcement elements to form a three-dimensional preform shape. The motion devices are preferably controlled by a computer system for positioning the deposition device with respect to the platform in accordance with a CAD-generated data file representing the shape. Further preferably, the same computer is used to regulate the operations of the material deposition device in such a fashion that liquid adhesive and reinforcement elements are dispensed in predetermined sequences and at predetermined proportions.

Specifically, the motion devices are responsive to a CAD-defined data file which is created to represent the 3-D preform shape to be built. A geometry (drawing) of the object is first created in a CAD computer. The geometry is then sectioned into a desired number of layers with each layer being comprised of a plurality of segments represented by a collection of data points. These layer data are then converted to machine control languages that can be used to drive the operation of the functional components, including motion devices. These motion devices operate to provide relative translational motion of the material depositing device with respect to the work surface in a horizontal direction within the X-Y plane. The motion devices further provide relative movements vertically in the Z-direction, each time by a predetermined layer thickness.

The material composition in the supply of liquid adhesive composition may be comprised of, but is not limited to, the following materials including various adhesives, waxes, solutions containing a thermoplastic polymer dissolved in a solvent, thermosetting resins, sol-gel mixtures, and combinations thereof. The material composition may also include combinations containing dissimilar materials added to impart a desired electrical, structural, or other functional characteristic to the material.

One presently preferred liquid adhesive composition comprises a hot melt adhesive that exhibits a high adhesion to previously deposited material. The hot melt adhesive also exhibits good mixing characteristics with a variety of reinforcements. Another preferred adhesive material composition comprises fine ceramic, metallic or polymeric particles either dispersed in a liquid (e.g., water) to make a paste or dissolved in a liquid (e.g., alcohol, acetone, or other solvents) to make a solution. The composition in a paste form or a solution normally will not require heating to become a flowable state. Solvents such as alcohol and acetone are fast vaporizing liquids. By dispensing or "blowing" a solution of acetone-diluted epoxy resin through the aggregate of reinforcement elements, for instance, acetone will quickly vaporize with epoxy resin staying to bond together reinforcement elements. The liquid may be vaporized under the assistance of a vacuum pump.

The reinforcement elements may also be selected from a wide variety of material types, including polymer, metal, glass, ceramic, and combinations thereof. In each case, the elements can be long fibers, short fibers, whiskers and particulates (including flakes, platelets, spherical particles, small discs, ribbons, etc) and combinations thereof.

In one embodiment, the liquid dispensing tool and the reinforcement dispensing tool may share the same nozzle. For instance, an air-assisted chopper/binder gun used in the directed spray-up of glass fiber preform may be adapted for use in the presently invented apparatus.

Advantages of the Invention

The process and apparatus of this invention have several features, no single one of which is solely responsible for its desirable attributes. Without limiting the scope of this invention as expressed by the claims which follow, its more prominent features will now be discussed briefly. After considering this brief discussion, and particularly after reading the section entitled "DESCRIPTION OF THE PREFERRED EMBODIMENTS" one will understand how the features of this invention offer its advantages, which include:

(1) The present invention provides a unique and novel method for producing a three-dimensional preform shape on a layer-by-layer basis under the control of a computer. This method does not require the utilization of a pre-shaped mold or tooling.

(2) Most of the layer manufacturing methods, including powder-based techniques such as 3-D printing (3DP) and selective laser sintering (SLS), are normally limited to the fabrication of an object with a uniform material composition. In contrast, the presently invented process readily allows the fabrication of a composite part having a spatially controlled material composition comprising two or more distinct types of reinforcement elements. This method offers an opportunity to impart desirable material composition patterns to a preform, making it possible to produce functional composites including functionally gradient composites.

(3) The presently invented method provides a computer-controlled process which places minimal constraint on the variety of materials that can be processed. In the present method, the liquid adhesive composition and the reinforcement elements may be selected from a broad array of materials including various organic and inorganic substances and their mixtures.

(4) The present method provides an adaptive layer-slicing approach and a thickness sensor to allow for in-process correction of any layer thickness variation (discussed later). The present invention, therefore, offers a preferred method of layer manufacturing when part accuracy is a desirable feature.

(5) The method can be embodied using simple and inexpensive mechanisms, so that the fabricator equipment can be relatively small, light, inexpensive and easy to maintain.

DESCRIPTION OF THE PREFERRED EMBODIMENTS

Figure 1:
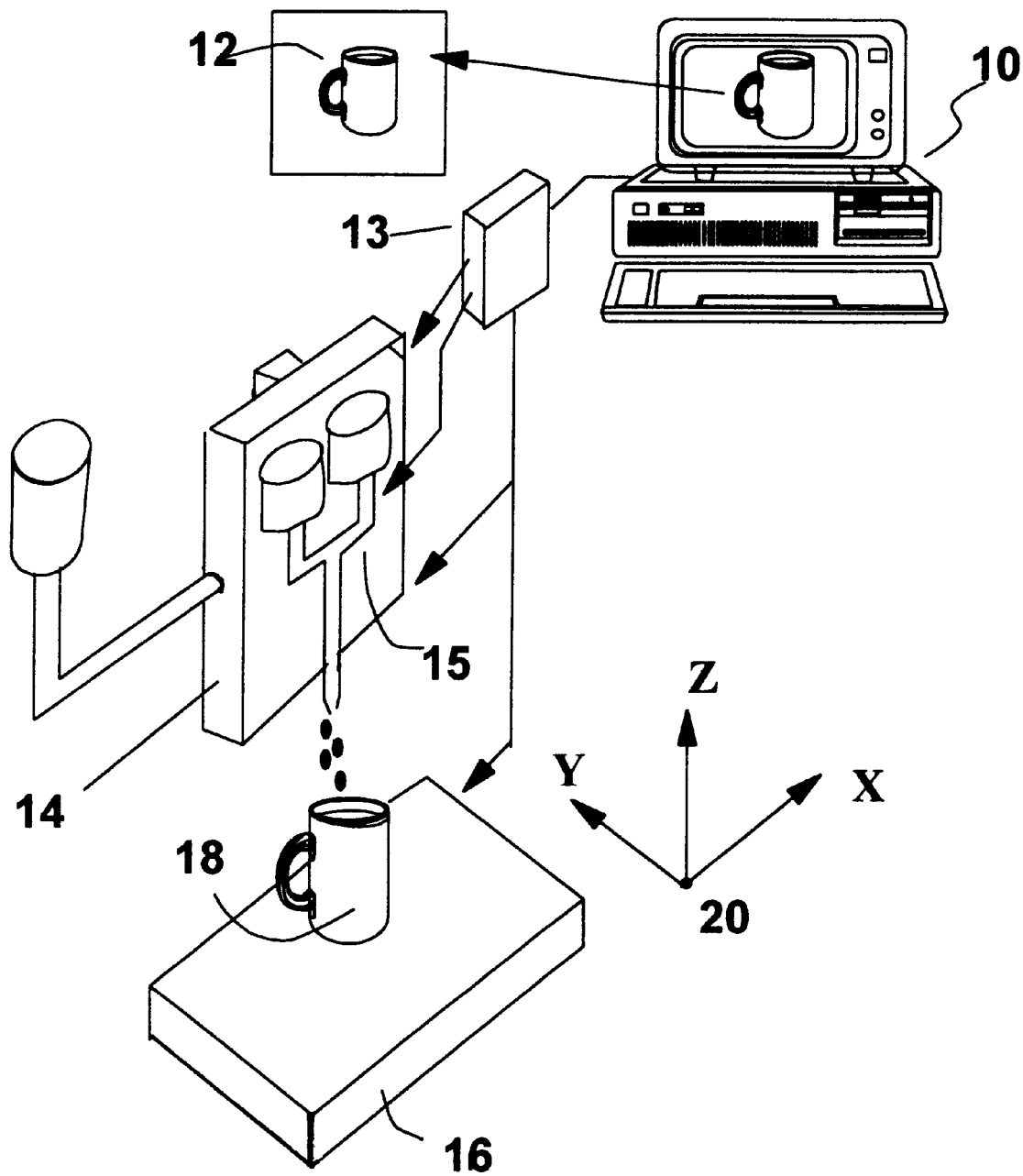
FIG. 1 Schematic of an apparatus for building a 3-D preform shape on a layer-by-layer basis, comprising a liquid adhesive dispensing tool, a multi-channel preform-dispensing tool, an object-supporting work surface capable of moving in an X-Y plane and in an orthogonal Z-axis in a desired sequence, and a computer control system.

In the drawings, like parts have been endowed with the same numerical references. FIG. 1 illustrates one embodiment of the apparatus of this invention for making three-dimensional reinforcement preform shapes. This apparatus is equipped with a computer 10 for creating a drawing or geometry 12 of an object and, through a hardware controller 13 (including signal generator, amplifier, and other needed functional parts) for controlling the operation of other components of the apparatus. One of these components is a material deposition device which comprises a liquid adhesive dispensing device (or tool) 14 and a reinforcement-dispensing device (or tool) 15. Other components include an object-supporting work surface 16, optional temperature-regulating means (not shown) and pump means (not shown) to control the atmosphere of a zone surrounding the work surface where a part 18 is being built, and a three dimensional movement system (not shown) to position the work surface 16 with respect to the material deposition device in a direction on an X-Y plane and in a Z-direction as defined by the rectangular coordinate system 20 shown in FIG. 1.

Material Deposition Device

Liquid Adhesive Dispensing Tool: There are a broad array of liquid adhesive dispensing tools that can be incorporated in the presently invented apparatus. One type of dispensing tool is a thermal ink jet print-head. A device of this type operates by using thermal energy selectively produced by resistors located in capillary filled ink channels near channel terminating orifices to vaporize momentarily the "ink" (in the present case, a liquid containing a binder adhesive) and form bubbles on demand. Each temporary bubble expels an ink droplet and propels it toward the object platform. For instance, in U.S. Pat. No. 4,571,599 (Feb. 18, 1986), Rezanka teaches about the configurations of thermally activated print-heads.

Another useful liquid adhesive dispensing tool is a piezo-electric activated ink jet print-head that uses a pulse generator to provide an electric signal. The signal is applied across piezoelectric crystal plates, one of which contracts and the other of which expands, thereby causing the plate assembly to deflect toward a pressure chamber. This causes a decrease in volume which imparts sufficient kinetic energy to the liquid in the print-head nozzle so that one liquid droplet is ejected through an orifice. Examples of piezoelectric activated ink jet print-heads may be found in U.S. Pat. No. 4,549,191 (Oct. 22, 1985) to Fukuchi.

Figure 2A:
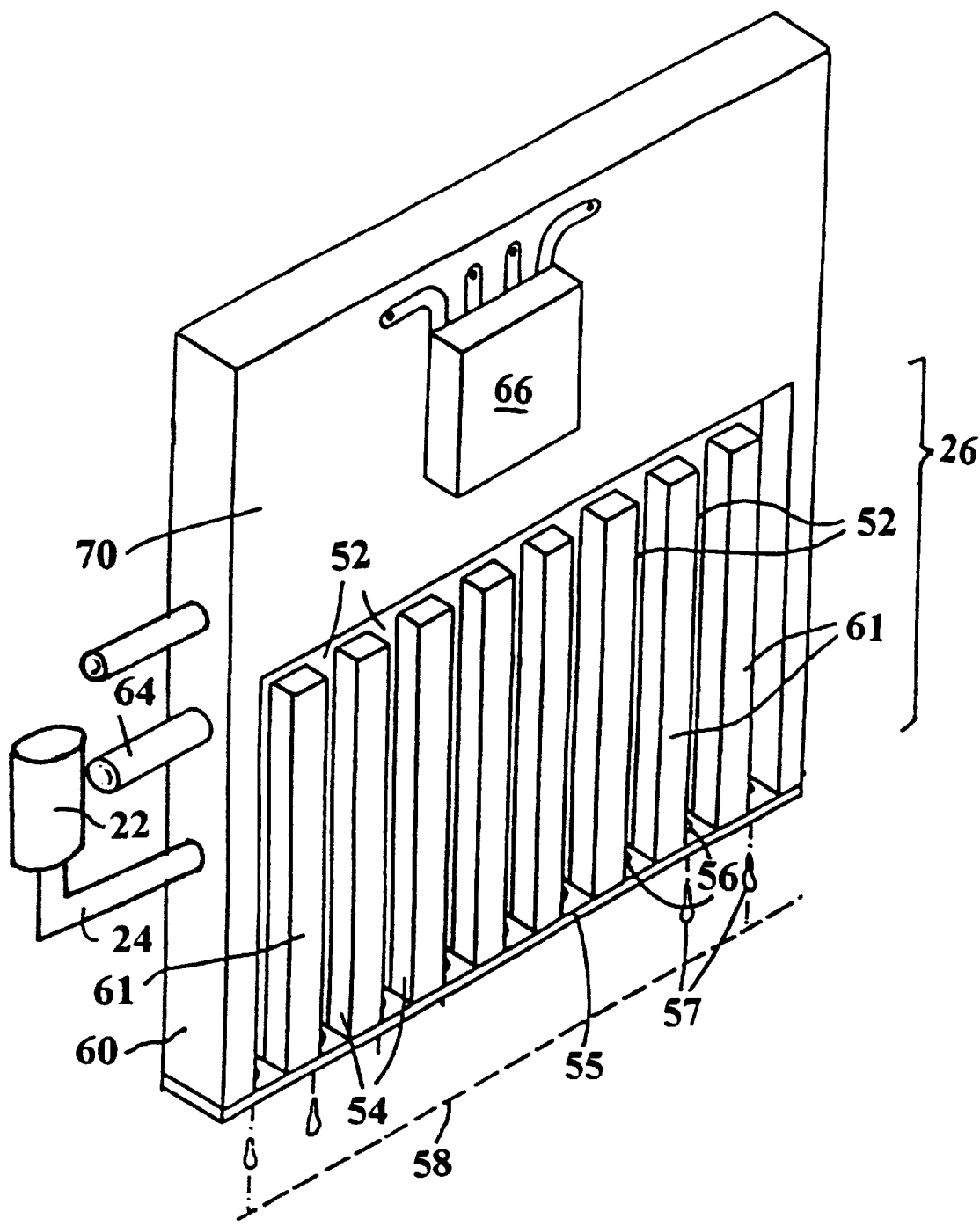
FIG. 2 (A) Schematic of a piezo-electric inkjet print-head for use as a liquid adhesive dispensing tool, (B) front view of the same print-head, and (C) bottom view of the same print-head.
Figure 2C:
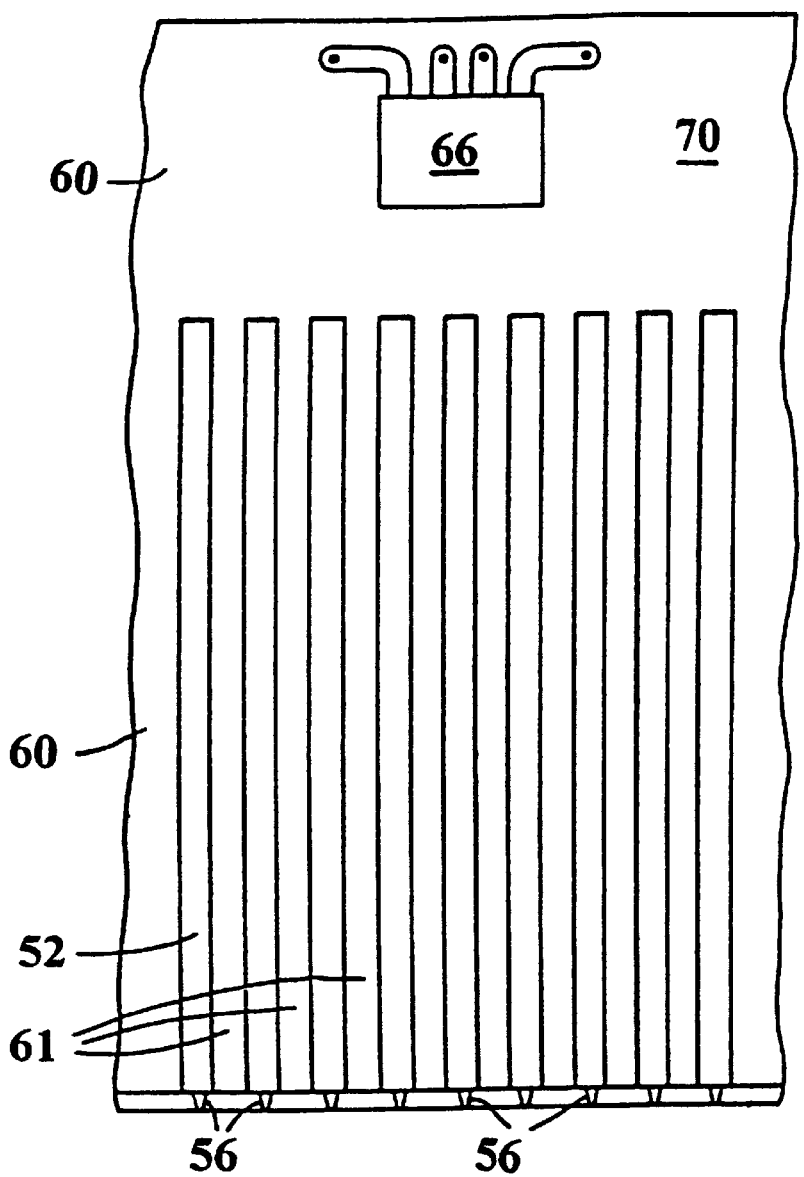
Figure 2B:
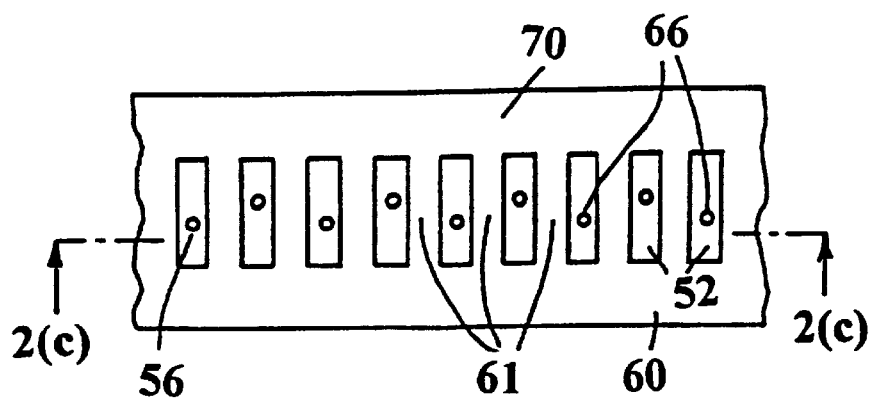

An example of a piezo-electric activated ink jet print-head is shown in FIGS. 2(A), 2(B) and 2(C). This liquid dispensing device is a planar high-density array, drop-on-demand ink jet print-head, comprising a print-head body 60 formed with a multiplicity of parallel liquid channels 52, nine only of which are shown and the longitudinal axes of which are disposed in a plane. The channels 52 contain liquid compositions 54 and terminate at corresponding ends thereof in a nozzle plate 55 in which are formed orifices 56, one for each channel. Liquid adhesive droplets 57 are ejected on demand from the channels 52 and deposited on selected spots of a print line 58 on a previous layer of an object or a surface of the work surface.

The print-head body 60 has a planar base part 70 in which the channels 52 are cut or otherwise formed so as to extend in parallel rearwardly from the nozzle plate 55. The channels 52 are long and narrow with a rectangular cross section and have opposite side walls 61 which extend the length of the channels. The side walls 61 are displaceable transversely relative to the channels axes along substantially the whole of the length thereof, as later described, to cause changes of pressure in the liquid composition in the channels to produce droplet ejection from the orifices 56. Each of the channels 52 connects at its end remote from the orifice, with a transverse channel (not shown) which in turn connects with a liquid supplying reservoir 22 by way of pipe means 24 or 64. Electrical connections (not shown) for activating the channel side walls 61 are made to a silicon chip 66 on the base part 70. Reservoirs are there to receive liquids containing an adhesive binder material. Only one 22 of possibly several reservoirs is shown in FIG. 2(A). Additional reservoirs may be connected to pipes such as 64. The droplet deposition device as illustrated in FIG. 2(A) is similar to what is disclosed in U.S. Pat. No. 4,887,100. The present device shown in FIG. 2(A) may contain separate reservoirs and pipes that supply different liquid adhesive compositions or different parts of a liquid composition (e.g., in a two-part epoxy resin adhesive).

Preferably, a portion of the liquid dispensing tool is provided with temperature-controlled means (not shown) to ensure that the material remains in a flowable state while residing in a reservoir, pipe, or channel prior to being dispensed. Heating and cooling means (e.g., heating elements, cooling coils, thermocouple, and temperature controller; not shown) may be provided to a region surrounding the work surface 16 to control the hardening behavior of the adhesive binder material on the work surface.

In another embodiment, one separate deposition device is supplied with a low-melting material (e.g., a wax) so that this nozzle is operative to discharge and build a support structure for any un-supported feature in the three-dimensional object being built. Un-supported features in an object include isolated islands, overhangs, and some suspended members of the object. There are many commercially available metering and dispensing nozzles that are capable of depositing wax and various resins such as epoxy and polyurethane. Examples include various two-component dispensing devices such as PosiDot$^R$ from Liquid Control Corp. (7576 Freedom Ave., North Canton, Ohio) and Series 1125 Meter-Mix-Dispense systems from Ashby-Cross Company, Inc. (418 Boston Street, Topsfield, Mass.) Any of such prior art dispensing nozzles can be incorporated as a part of the presently invented apparatus to deposit a resin- or wax-based support structure when and where needed.

It may be noted that a wide range of other prior-art liquid dispensing tools may be used in the present invention, e.g., a device similar to an aerosol sprayer, air-assisted spraying gun used in applying paint or coating, etc. The purpose of using an adhesive liquid dispensing tool is to provide a small amount of binder material which, when dried and hardened, acts to bond together reinforcement elements (e.g., between short fibers at their points of contact) to maintain the preform in a desired shape (i.e., to "rigidize" the preform). The adhesive only serves as a binder, not as a major matrix material for making a composite part. Instead, this binder helps to hold the preform in a desired shape when at a later stage the preform is impregnated with a fluid-phase matrix material. This binder may be partially or completely burned off prior to matrix impregnation. Preferably, this reinforcement binder is a material chemically compatible with the intended matrix material. For instance, polyamide acid can be used as a binder material dispersed in a proper solvent. The solution is then sprayed into a carbon fiber preform with the solvent vaporized and polyamide acid staying at fiber contact points. When heated, polyamide acid is converted to polyimide which hardens and bonds the fibers together to form a rigidized preform. This preform may be later impregnated with a polymer matrix which is chemically compatible with the binder polyimide. In this case, a polyimide (same or different composition as the binder), a bimale imide, poly (amide imide), epoxy resin and the like can be used as a matrix resin for making a composite.

Thermosetting resin-based adhesives can be cured by using a variety of energy sources other than heat. These include, but are not limited to, visible light, ultraviolet (UV), Gamma radiation, electron beam, ion beam, laser beam, plasma, etc. These energy sources and heat may be used separately or in combination. Fast-reacting UV-curable resins are particularly advantageous for use in the present invention to rigidize the preform. UV curing equipment and UV-curable adhesives are readily available commercially.

Figure 4:
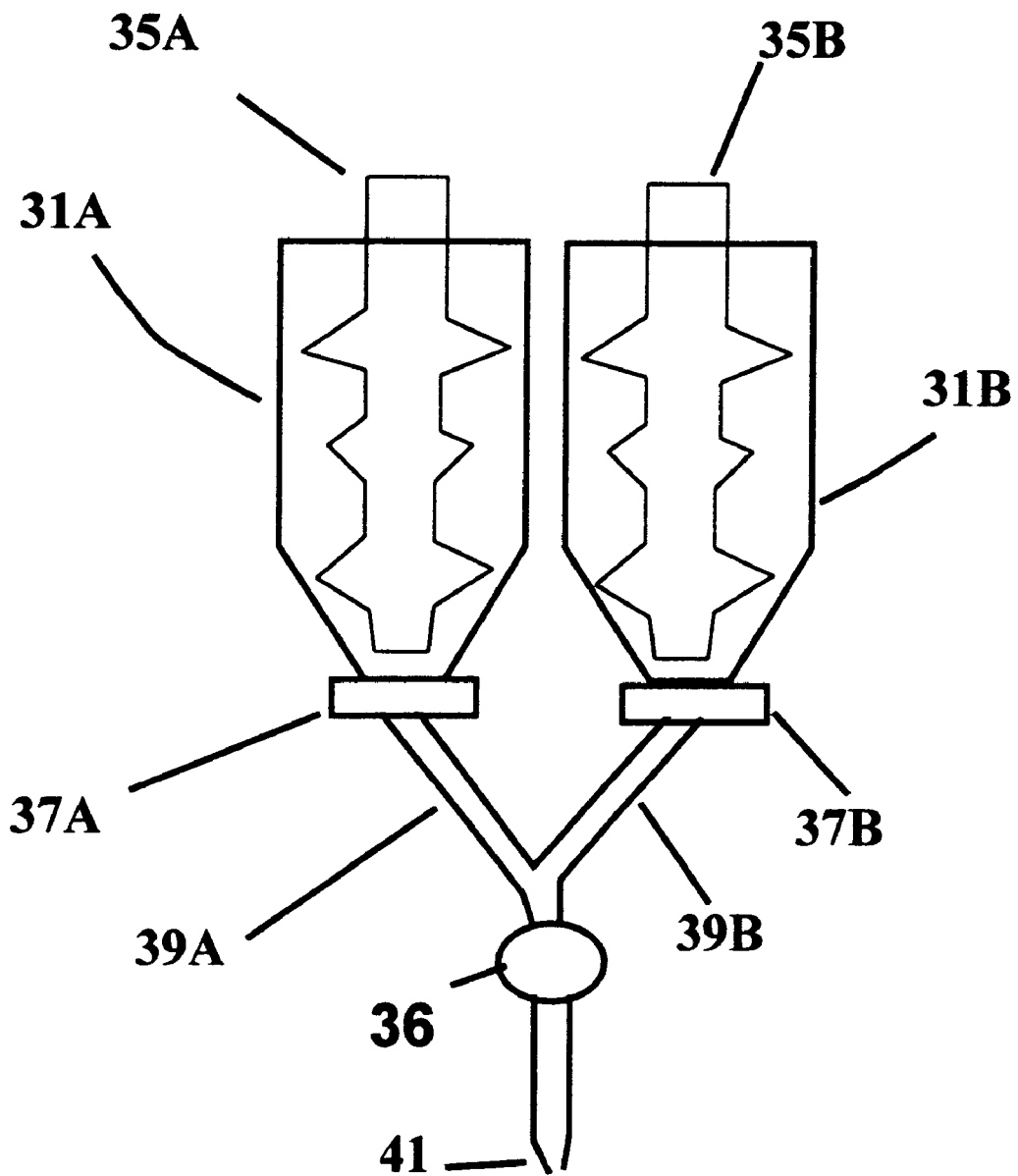
FIG. 4 Schematic drawing of a simple multi-channel particulate-delivery device.

Reinforcement-Dispensing Tool: FIG. 4 schematically shows a multi-channel solid reinforcement delivery device which is capable of supplying and dispensing a mixture of different reinforcement elements (short fibers, whiskers, particulates, etc.) at a desired proportion. Only two channels are shown here. The two chambers 31A, 31B are used to house different solid reinforcement elements (hereinafter also referred to as solid particles). An optional stirring device 35A or 35B is used to facilitate feeding of solid particles through valves 37A or 37B. These valves are preferably electronically connected to the machine controller 13, which is regulated by the computer 10 (in FIG. 1). If a valve is turned on, solid particles will flow through a pipe 39A or 39B, enter an optional mixing chamber 36, and be dispensed through an orifice 41. The mixing chamber 36 provides a place where different reinforcement elements coming from different chambers can be mixed together before they are dispensed. The proportion between elements can be readily varied continuously or intermittently by adjusting, for instance, the opening sizes of the valves 37A, 37B.

Figure 5:
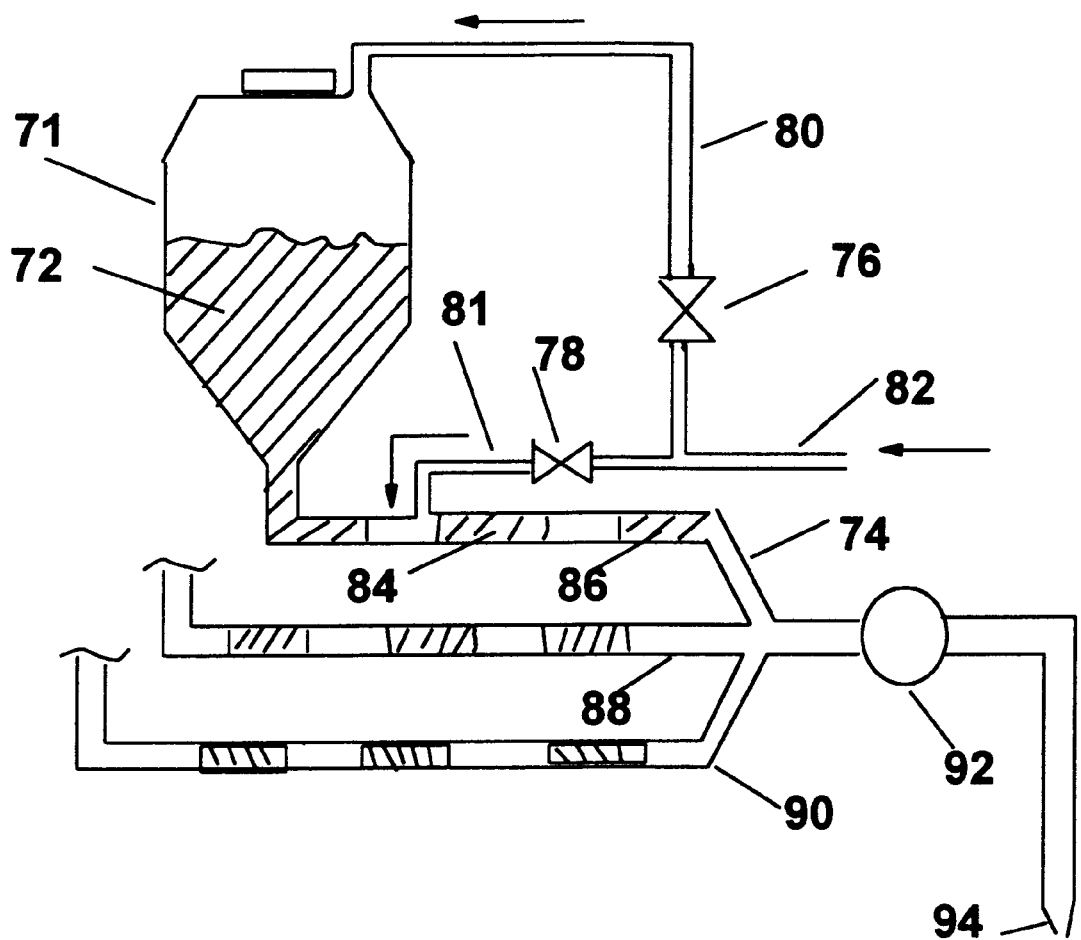
FIG. 5 Schematic drawing of a multi-channel plug-phase pneumatic particulate conveying and dispensing device.

FIG. 5 schematically shows another example of multiple-channel reinforcement delivery devices. Only three channels of this pneumatic or air-driven tool are shown. This device makes use of the approach known as plug-phase conveying to reduce clogging that frequently occurred to dense-phase conveying. Both approaches are well known in the art of pneumatic powder transportation. In the present device, a container 71 is used to house one type of reinforcement elements 72. Compressed air is introduced through pipe 82. Then, through alternating operations of valves 76 and 78, air runs through pipes 80 and 81, respectively, to create and convey forward distinct plugs of solid particles in first channel 74. Other channels (e.g., 88 and 90) may be similarly equipped with containers, pipes, and valves (not shown) to create and move plugs of different types of solid particles. Plugs of materials may be allowed to mix at an optional mixing chamber 92 and then dispensed through an orifice 94 of a nozzle. The present device does not provide a continuous flow of powder because plugs of material (e.g., 84 and 86) are separated by plugs of air. If necessary, however, a continuous flow of powder can be achieved by running two parallel pipelines operating at opposite phases. With the present device, by controlling the velocity of plugs throughout each of the material supply systems, different proportions of each material could be combined and deposited. Such a multiple-channel reinforcement delivery device will make it possible to produce parts with spatially tailored material compositions.

Figure 3:
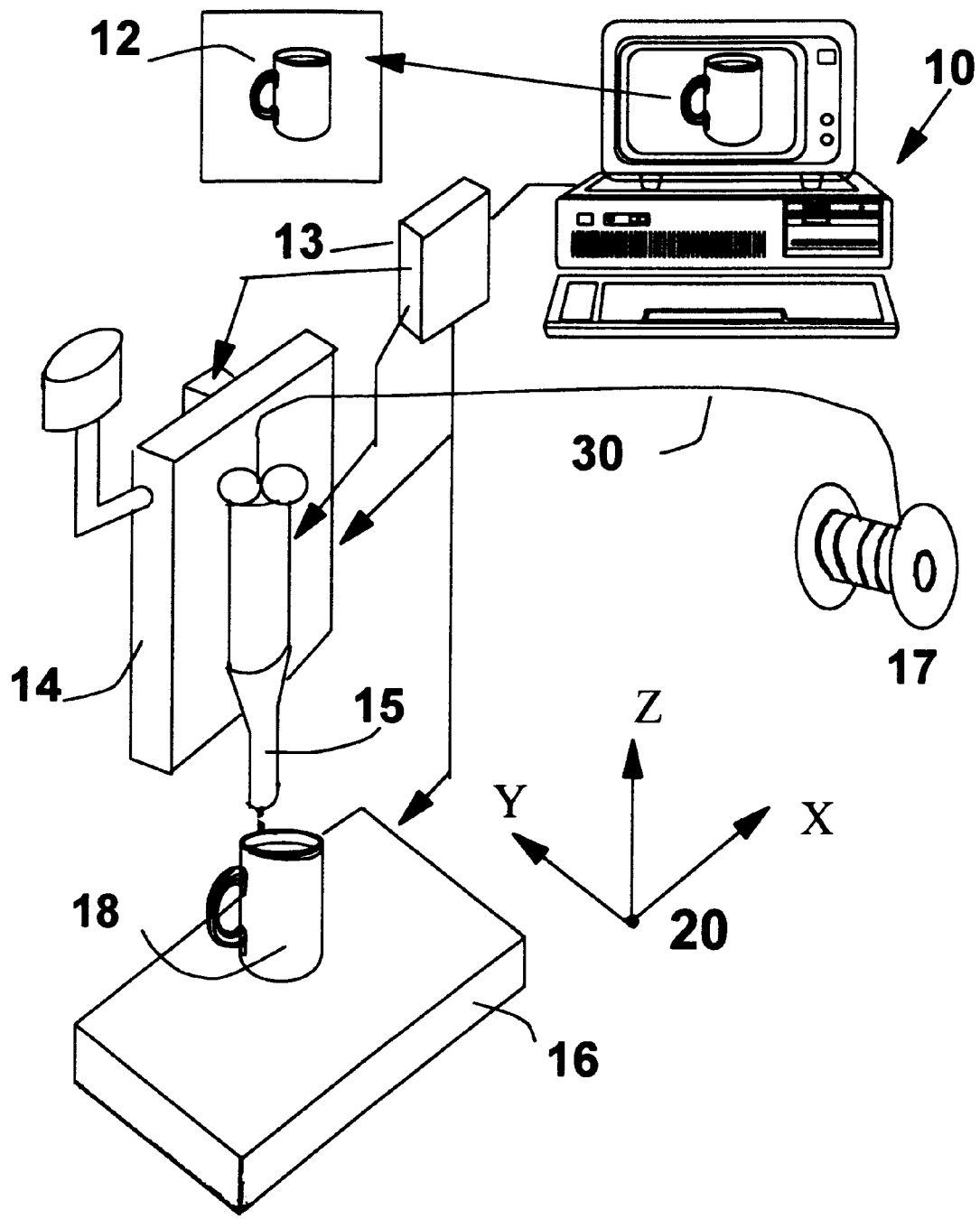
FIG. 3 Schematic of another 3-D preform building apparatus, comprising an adhesive dispenser and a preform-dispensing device, which comprises a fiber chopper (not shown, inside the nozzle).

The reinforcement-dispensing device 15 of FIG. 3 is capable of accepting or pulling a continuous strand or tow 30 of fibers into a channel of this device from a supply 17. This channel may be equipped with a set of rollers driven by a motor to pull or drag the tow into and out of this device (comprising a nozzle) to deposit the fibers at desired locations. Alternatively, this fiber dispensing device may be equipped with a fiber chopper (e.g., as shown in FIG. 6A) to cut the fiber tow into short fibers prior to dispensing through a nozzle of this device.

Optionally, a compaction effector such as a doctor's blade, a roller, or a flat platen may be used to facilitate compaction of regions that are taller than a desired height. These regions of reinforcement are compressed to approximately the final thickness, which is followed by hardening the adhesive binder to rigidize the preform. Once this rigidization procedure is completed, the compaction effector is retreated (compression force being released). The preform will stay essentially in this rigidized shape, rather than spring back to a greater height. The compaction effector may be attached to the material deposition sub-system and be regulated by the same movement devices.

Object-Supporting Work Surface

Referring again to FIG. 1, the work surface 16 is located in close, working proximity to the dispensing nozzles of the material deposition device. This work surface preferably has a flat region sufficiently large to accommodate the first few layers of the deposited material. Preferably, the liquid dispensing tool 14 and reinforcement (solid particle) dispensing tool 15 of the material deposition device are fastened to move as one unit. The work surface 16 and the material deposition device are equipped with mechanical drive means for moving the work surface relative to the deposition device in three dimensions along the X-, Y-, and Z-axes in a rectangular coordinate system in a predetermined sequence and pattern, and for displacing the nozzle a predetermined incremental distance relative to the platform. This can be accomplished, for instance, by allowing the work surface 16 to be driven by three linear motion devices, which are powered by three stepper motors to provide movements along the X-, Y-, and Z-directions, respectively. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art.

Z-axis movements are executed to displace the work surface 16 relative to the material deposition device or to displace the deposition device relative to the work surface and, hence, relative to each layer deposited prior to the start of the formation of each successive layer. In one possible arrangement, the deposition device may be mounted in a known fashion for movement in the X-Y plane, with the work surface 16 supported for separate movement toward and away from the deposition device along the Z-direction. Alternatively, the work surface may be supported for movement in the X-Y plane, with the deposition device mounted for separate movement along the Z-direction toward and away from the work surface. Another alternative is to have the movements in the X-Y plane and in the Z-direction all to be carried out by either the work surface only or by the deposition device only. It will be understood that movement in the X-Y plane need not be limited to movement in orthogonal directions, but may include movement in radial, tangential, arcuate and other directions in the X-Y plane.

These movements will make it possible for the deposition device to deposit and form multiple layers of materials of predetermined thickness, which build up on one another sequentially as the liquid adhesive hardens after discharge from the orifice. The rate at which the liquid droplets are discharged from the discharge orifice onto the work surface is dictated by the frequency of the piezo-electric pulses and the orifice size. This rate can be adjusted, by varying the pulse signal generating speed, to meet the possible needs of variable rate at which the nozzle moves with respect to the work surface. The reinforcement dispensing rate depends upon the valve opening sizes (e.g., in FIG. 4) and the powder plug transport rate (e.g., in FIG. 5).

Sensor means may be attached to proper spots of the work surface or the material deposition device to monitor the physical dimensions of the physical layers being deposited. The data obtained are fed back periodically to the computer for re-calculating new layer data. This option provides an opportunity to detect and rectify potential layer variations; such errors may otherwise cumulate during the build process, leading to significant part inaccuracy. Many prior art dimension sensors may be selected for use in the present apparatus.

Materials

The liquid adhesive compositions do not have to be in a melt state. A water-soluble material such as poly (ethylene oxide) may be allowed to mix with a predetermined amount of water to form a flowable solution or paste. Thermoplastics may be dissolved in a solvent. Even a thermosetting resin (such as epoxy) may be further diluted in a fast vaporizing solvent like acetone. Some materials (e.g., plaster and starch) may be dispersed, but not completely dissolved, in water or alcohol. These types of materials may also be fed into the reservoirs along with water or a proper liquid to make a paste.

A fast-curing thermosetting resin (e.g., a two-part epoxy) may be maintained in an oligomer state prior to being discharged. As soon as being dispensed, the resin will rapidly gel to an extent that the glass transition temperature of this reacting resin quickly approaches or exceeds the work surface environment temperature, thereby solidifying the resin. The gelation process of selected resins, e.g., some photo curable epoxy resins commonly used in stereo lithography, may be further accelerated by exposing the deposited resin to an ultraviolet beam, UV radiation, Gamma ray, electron beam, ion beam, laser beam, and/or plasma. Fast curing resins are well known in the art and several formulations are commercially available.

A sol-gel material (e.g., a polymer gel composed of a lightly cross-linked network of chains with small molecules occupying interstices between these chains) can be formulated to have proper flowability prior to being discharged from a nozzle. The gelation process of the material when brought in contact with the work surface or a previous layer may be rapidly advanced further to increase its viscosity to facilitate solidification. A ceramic precursor gel, after being deposited to points of contact between reinforcement elements, may then be converted to become ceramic, thereby rigidizing the preform.

Reinforcement materials in the present invention can be polymeric, ceramic, metallic, etc. They can be supplied in a wide variety of forms including a continuous fiber tow, monofilament, short fiber, whisker, and various particulate shapes (spherical particle, ellipsoidal particle, platelet, disc, needle, ribbon, flake, etc.).

Mathematical Modeling and Creation of Logical Layers

Figure 7:
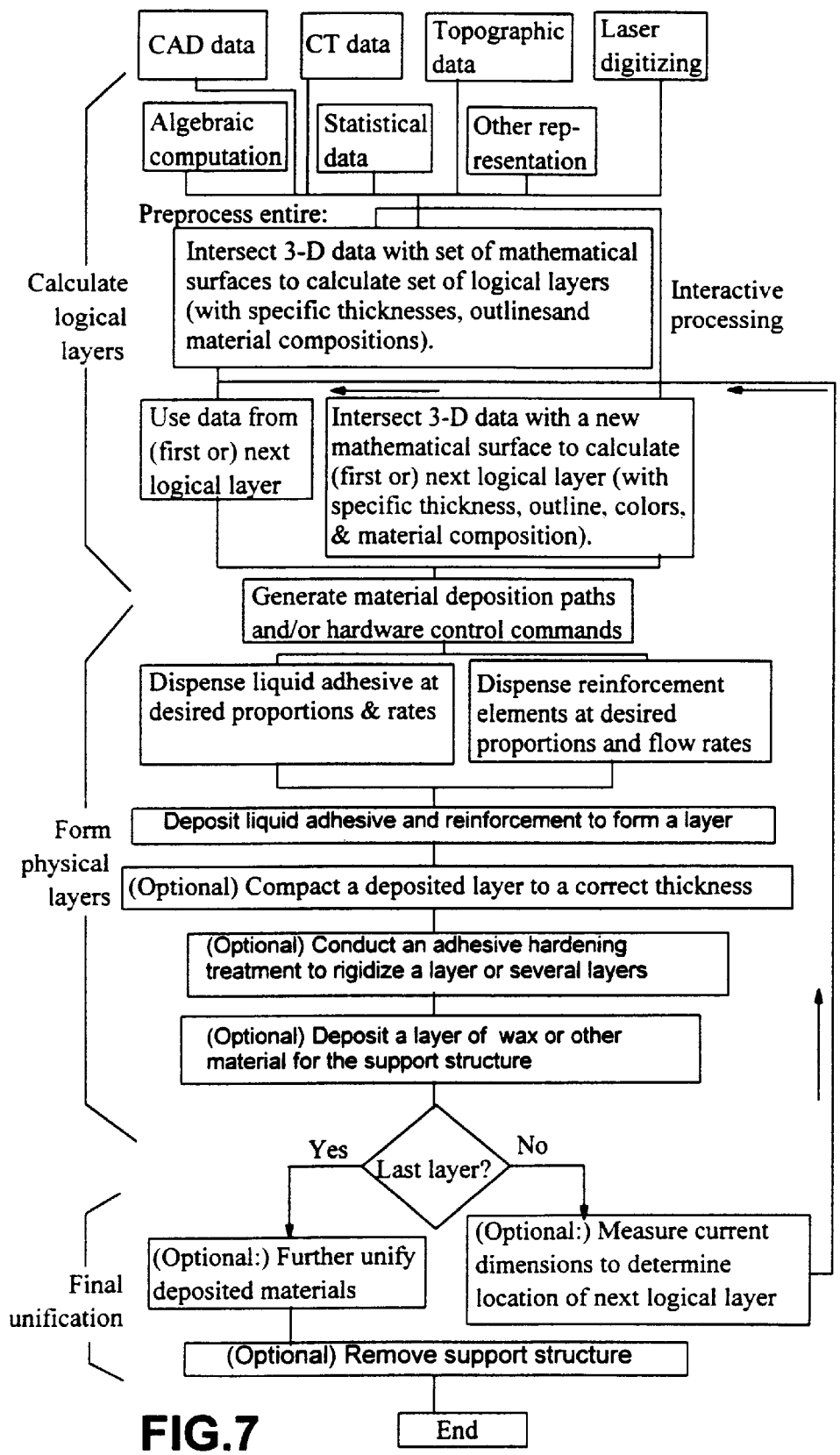
FIG. 7 Flow chart indicating a preferred process that involves using a computer and required software programs for adaptively slicing the geometry of an object into layer data, for optionally generating data files for support structures, and for controlling various components of the 3-D object building apparatus.

A preferred embodiment of the present invention is a solid freeform fabrication process in which the execution of various steps may be illustrated by the flow chart of FIG. 7. The process begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions of an individual layer of deposited materials, is stored in the memory of a computer in a logical sequence so that the data packages correspond to individual layers of the materials stacked together to form the object.

Specifically, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. Therefore, in considering two layers that come one after the other in the sequence, the mutually abutting surfaces of the two layers must contact each other at every point, except at such points of one layer where the corresponding point of the other layer is void of material as specified in the object model.

As summarized in the top portion of FIG. 7, the data packages for the logical layers may be created by any of the following methods:

(1) For a 3-D computer-aided design (CAD) model, by logically "slicing" the data representing the model, (2) For topographic data, by directly representing the contours of the terrain, (3) For a geometrical model, by representing successive curves which solve "z=constant" for the desired geometry in an x-y-z rectangular coordinate system, and (4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the curvature and thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves are the boundary between the positive and negative regions, and are called the "outline" of the layer. In the present context, the liquid droplets and solid powder are allowed to be deposited in the "positive region" while a wax may be deposited in certain parts or all of the "negative region" in each layer to serve as a support structure.

A preferred embodiment of the present invention contains a material deposition sub-system, an object platform, and motion devices that are regulated by a computer-aided design (CAD) computer 10 and a machine controller 13. For example, as schematically shown in FIG. 1, the CAD computer with its supporting software programs operates to create a three-dimensional image of a desired object 12 or model and to convert the image into multiple elevation layer data, each layer being composed of a plurality of segments.

As a specific example, the geometry of a three-dimensional object 12 may be converted into a proper format utilizing commercially available CAD/Solid Modeling software. A commonly used format is the stereo lithography file (.STL), which has become a defacto industry standard for rapid prototyping. The object image data may be sectioned into multiple layers by a commercially available software program. Each layer has its own shape and dimensions. These layers, each being composed of a plurality of segments, when combined together, will reproduce the complete shape of the intended object. When a colorful object is desired, these segments are preferably sorted in accordance with their colors. This can be accomplished by taking the following procedure:

When the stereo lithography (.STL) format is utilized, the geometry is represented by a large number of triangular facets that are connected to simulate the exterior and interior surfaces of the object. The triangles may be so chosen that each triangle covers one and only one material composition. In a conventional .STL file, each triangular facet is represented by three vertex points each having three coordinate points, $(x_1,y_1,z_1)$, $(x_2,y_2,z_2)$ and $(x_3,y_3,z_3)$, and a unit normal vector $(i,j,k)$. Each facet is now further endowed with a material composition code to specify the desired reinforcement type and adhesive. This geometry representation of the object is then sliced into a desired number of layers expressed in terms of any desired layer interface format (such as Common Layer Interface or CLI format). During the slicing step, neighboring data points with the same material composition code on the same layer may be sorted together. These segment data in individual layers are then converted into programmed signals (data for selecting deposition tools and tool paths) in a proper format, such as the standard NC G-codes commonly used in computerized numerical control (CNC) machinery industry. These layering data signals may be directed to a machine controller which selectively actuates the motors for moving the material deposition device with respect to the object-supporting work surface, activates signal generators, drives the valve means in the reinforcement dispensing tool, drives the liquid adhesive dispensing tool, drives the optional vacuum pump means, and operates optional temperature controllers, etc. It should be noted that although .STL file format has been emphasized in this paragraph, many other file formats have been employed in different commercial rapid prototyping and manufacturing systems. These file formats may be used in the presently invented system and each of the constituent segments for the object geometry may be assigned a material composition code if an object of different material compositions at different portions is desired.

The three-dimensional motion controller is electronically linked to the mechanical drive means and is operative to actuate the mechanical drive means in response to "X", "Y", "Z" axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments. These and other software packages (e.g. Bridgeworks from Solid Concepts, Inc.) are also available for identifying an un-supported feature in the object and for generating data files that can be used to build a support structure for the un-supported feature. The support structure may be built by a separate fabrication tool or by the same deposition device that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated fabricator comprising a material deposition device, a work surface, and motion devices. Using these data packages, the computer controls the automated fabricator to manipulate the fabrication materials (liquid adhesive compositions and solid reinforcement elements) to form individual layers of materials in accordance with the specifications of an individual data package. The liquid adhesive compositions used to bind the layer contours of reinforcement elements preferably have the property that they can be readily hardened, solidified, or cured layer-by-layer. In one embodiment of the invention, the liquid compositions and their mixtures with solid particles (reinforcement elements) preferably have the further property that the contours of the fabrication materials when brought into contact bond to each other so that individual layers can be readily unified.

The fabrication materials do not have to be homogeneous. They may, for example, exhibit variations in composition based upon the structural or physical requirements of the desired object being built. These variations may serve to accomplish internal variations of the physical properties of the object, such as hardness, mass density, and coefficient of thermal expansion and variations of external appearance such as color patterns. In one preferred embodiment, the solid reinforcement elements may be deposited to comprise a spatially controlled material composition comprising two or more distinct types of reinforcement materials. In a further specific embodiment, the elements may be deposited in continuously varying concentrations of distinct types of materials. These material composition variations can be readily accomplished by operating the presently discussed reinforcement-dispensing device.

If composition variation of a deposition material is desired within any particular layer, and if the mechanism for depositing the fabrication material has the capability of depositing the required various compositions automatically, then the variation in composition may be represented mathematically within the data package for each layer, and the mathematical representation may be used to control the composition of materials deposited. However, if the mechanism for depositing a material is limited to providing layers of any one specific composition at a time, then variations in composition may be accomplished by logically separating a particular layer into sub-layers, where each sub-layer is composed of a different material, and the union of the sub-layers is equal to the particular layer. Each sub-layer is then treated as a distinct layer in the deposition process, and the complete layer is formed by the formation and bonding of a succession of its constituent sub-layers. If the interface between sub-layers is along surfaces perpendicular to the layers, and not along surfaces parallel to the layers, then the bonding of each sub-layer is not to the previous sub-layer, but to the previous complete layer.

Referring to FIG. 7, therefore, as another embodiment of the present invention, a solid freeform fabrication process may comprise the steps of:

(1) operating a material deposition device for dispensing a liquid adhesive composition and reinforcement elements;

(2) providing a work surface in a close working vicinity of the material deposition device to receive the liquid adhesive and solid reinforcement elements therefrom; and (3) during the material deposition process, moving the deposition device and the work surface relative to one another in an X-Y plane defined by a first and second direction and in a third or Z direction orthogonal to the X-Y plane to form the deposited materials into a three dimensional object.

A preferred embodiment is a process as set forth in the above three steps, wherein the moving step includes the steps of (a) moving the material deposition device and the work surface relative to one another in a direction parallel to the X-Y plane to form a first layer of the materials on the work surface; (b) moving the deposition device and the work surface away from each other by a predetermined layer thickness; and (c) after the portion of the first layer adjacent to a nozzle of the material deposition device has hardened, dispensing a second layer of the materials (liquid adhesive and reinforcements) onto the first layer while simultaneously moving the work surface and the deposition device relative to one another in a direction parallel to the X-Y plane, whereby the second layer hardens and adheres to the first layer.

A further preferred embodiment is a process as set forth in the above three steps, (1) through (3) plus (a), (b) and (c), further comprising additional steps of forming multiple layers of the materials on top of one another by repeated dispensing of liquid adhesive and reinforcement elements from the deposition device as the work surface and the deposition device are moved relative to one another in a direction parallel to the X-Y plane, with the deposition device and the work surface being moved away from one another in the Z-direction by a predetermined layer thickness after each preceding layer has been formed, and with the dispensing of each successive layer being controlled to take place after the material in the preceding layer immediately adjacent the nozzle has substantially hardened. These steps can be accomplished by operating the apparatus described above either manually or, preferably, under the control of a computer system.

Figure 6:
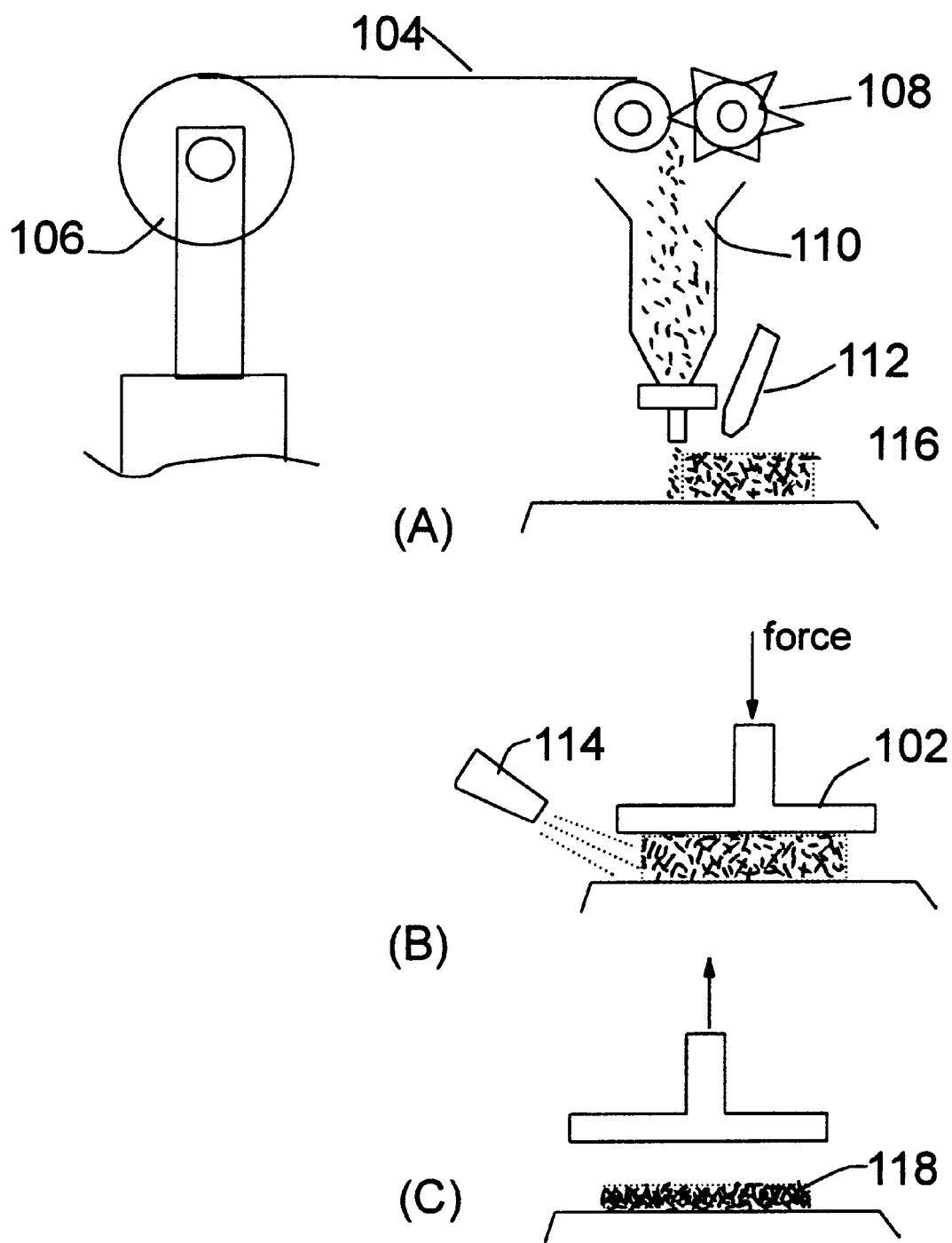
FIG. 6 Schematic of a preferred process that involves (A) depositing a cross section of reinforcement elements and, concurrently or sequentially, a necessary amount of adhesive binder; (B) (optionally) compressing the cross section to a smaller thickness and hardening the binder to rigidize this cross section layer; (C) releasing the compressive force (retreating the compression tool) and getting ready for the deposition of a next layer.

As shown in FIG. 6, one may choose to dispense any selected layer of reinforcement-adhesive materials initially to a larger-than-necessary height and then compress the layer down to approximately the final desired thickness. This desired thickness can be preserved by hardening the adhesive to a proper extent prior to removal of the compression force. The process begins with feeding a fiber tow or roving 104 from a spool 106 and then using a chopper 108 to cut the roving into short fibers which are received by a hopper 110 and directed to deposit onto a work surface to form a cross section of fiber aggregates 116. During the deposition of fibers, a small amount of binder adhesive is dispensed, concurrently or sequentially, from a liquid adhesive dispenser 112 to bond together individual fibers. This cross section of deposited materials (fibers and binder) is then compressed by a compression effector 102 to a desired thickness (FIG. 6B). Hardening means (e.g., hot air and/or ultraviolet light 114, etc.) are introduced to harden the binder for rigidizing this layer of preform. By retreating the compression effector 102, one obtains a layer of rigidized preform 118 of a desired thickness. This approach serves to increase the reinforcement content of this selected layer (leaving behind less space for impregnation by a matrix material at a later time) if deemed necessary. One need not do this compression step for every layer. One may choose to compress and harden several layers at a time.

Another preferred embodiment is a process as set forth in the above three steps, (1) through (3) plus (a), (b) and (c), further comprising the steps of (4) creating a geometry of the three-dimensional object on a computer with the geometry including a plurality of segments defining the object; (5) generating programmed signals corresponding to each of these segments in a predetermined sequence; and (6) moving the deposition device and the work surface relative to one another in response to the programmed signals. These additional steps provide computerized control over the relative motions between the deposition device and the work surface to build a 3-D preform shape. However, the material composition pattern of a preform shape is not necessarily predetermined. The adjustments of reinforcement for different portions of an object can be made at any time during the object building process or in a random fashion, if so desired.

If a predetermined reinforcement composition pattern is desired before the preform building process begins, then this pattern may be defined by attaching a reinforcement composition code to each of the constituent segments defining the object. When the computer reads a specific code, during the object building process, it will send out proper control signals to select the correct channels for dispensing a selected combination of reinforcement elements. Therefore, another embodiment of the present invention is a process as set forth in the above three steps, (1) through (3), but further comprising the steps of (d) creating a geometry of the object on a computer with the object including a plurality of segments defining the object and with each of the segments being coded with a reinforcement composition defined by the operation of a specific set of selected channels; (e) generating programmed signals corresponding to each of these segments in a predetermined sequence; (f) operating the pulse generator (actuator means) in response to the programmed signals to activate selected channels; and (g) moving the deposition device and the work surface relative to one another in response to the programmed signals.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with proper reinforcement patterns. These considerations have led to the development of another embodiment of the present invention. This is a process as set forth in the above-cited three steps, (1) through (3), wherein the moving step includes the step of moving the deposition device and the work surface relative to one another in a direction parallel to the X-Y plane according to a first predetermined pattern to form an outer boundary of one selected reinforcement composition or pattern onto the work surface. The outer boundary defines an exterior surface of the object.

Another embodiment is a process as set forth in the above paragraph, wherein the outer boundary defines an interior space in the object, and the moving step further includes the step of moving the deposition device and the work surface relative to one another in one direction parallel to the X-Y plane according to at least one other predetermined pattern to fill this interior space with a mixture of a liquid adhesive composition and selected reinforcement materials. The interior does not have to have the same material composition as the exterior boundary. The interior space may be built with materials of a spatially controlled composition comprising one or more distinct types of materials. The solid particles may be deposited in continuously varying concentrations of distinct types of materials. This process may further comprise the steps of (h) creating a geometry of the object on a computer with the geometry including a plurality of segments defining the object; and (i) generating program signals corresponding to each of these segments in a predetermined sequence, wherein the program signals determine the movement of the deposition device and the work surface relative to one another in the first predetermined pattern and at least one other predetermined pattern.

The above procedures of delineating a boundary of a cross section and filling in the interior space of the cross section may be automated by using a computer system. This can be achieved by following the following steps: (j) creating a geometry of the object on a computer with the geometry including a plurality of segments defining the object; (k)

generating program signals corresponding to each of the segments in a predetermined sequence; (1) activating one liquid dispensing channel and one powder dispensing device to deposit mixtures of liquid and solid materials at predetermined proportions onto the surface where a layer is being made; and (m) during this dispensing step, moving the deposition device and the work surface in response to the programmed signals relative to one another in the X-Y plane and in the Z-direction in a predetermined sequence of movements such that the liquid adhesive and solid particles (reinforcement elements) are dispensed in free space as a plurality of segments sequentially formed so that the last dispensed segment overlies at least a portion of the preceding segment in contact therewith to thereby form the object.

In summary, a process for making a three-dimensional composite preform shape has been developed. In its broadest embodiment, but still being embraced within the present invention, such a process comprises the steps of (A) creating a geometry of a three-dimensional preform shape on a computer with the geometry including a plurality of segments defining this shape and each segment being coded with a reinforcement composition; (B) evaluating the geometry data files representing the shape to locate any un-supported feature of the shape, followed by defining a support structure for the un-supported feature and creating a plurality of segments defining the support structure; (C) generating program signals corresponding to each of these constituent segments for both the preform shape being built and the support structure in a predetermined sequence; (D) providing a liquid composition and selected reinforcement composition for the shape and one material composition for the support structure; (E) feeding the material compositions to selected dispensing channels; (F) dispensing liquid adhesive composition and reinforcement composition onto desired spots of a work surface on which an object is being built; (G) during this dispensing step, moving the deposition device and the work surface in response to the programmed signals relative to one another in the X-Y plane and in the Z-direction in a predetermined sequence of movements such that the reinforcement and adhesive compositions are deposited in free space as a plurality of segments sequentially formed so that the last dispensed segment overlies at least a portion of the preceding segment in contact therewith to thereby form the support structure and the three-dimensional preform shape.

This last step (G), for instance, may include first building a first portion of a first layer with a first reinforcement material composition. A second portion of this first layer is then built possibly with a material composition containing a different reinforcement. The desired reinforcement elements of individual portions are determined by their respective reinforcement composition codes. Material composition codes are also included in their mathematical representation data packages. These procedures are repeated until the first layer is completed. A second layer, either single- or multiple-material as desired, is then built by following a similar set of procedures. The procedures are continued until multiple layers, with each layer possibly having a different reinforcement pattern, are completed to build a multi-reinforcement preform for use in making a hybrid composite. Clearly, the apparatus as herein specified can be adapted to readily accomplish the above procedures.

What is claimed:

1. A process for fabricating a net-shape reinforcement preform for a composite material part, in a layer-by-layer manner comprising (a) providing a work surface lying substantially parallel to an X-Y plane of an X-Y-Z Cartesian coordinate system defined by three mutually perpendicular X-, Y- and Z-axes;

(b) positioning a material deposition device at a predetermined initial distance from said work surface, said deposition device comprising at least a reinforcement dispensing tool and an adhesive dispensing tool;

(c) operating and moving said material deposition device relative to said work surface along selected directions in said X-Y plane to deposit first layer of selected reinforcement and adhesive compositions onto said work surface, said first layer being of a predetermined cross-sectional shape on said X-Y plane and a predetermined thickness in said Z-axis direction;

(d) moving said material deposition device away from said work surface along said Z-axis direction by a predetermined distance, (e) operating and moving said material deposition device to deposit another layer of selected reinforcement and adhesive compositions of another predetermined cross-sectional shape and thickness, and (f) repeating steps (d) and (e) to deposit multiple layers of reinforcement and adhesive compositions for forming said net-shape reinforcement preform.

2. A process for fabricating a net-shape reinforcement preform as defined in claim 1, wherein each said reinforcement composition is selected from the group of reinforcements consisting of short fiber, long fiber, whisker, spherical particle, ellipsoidal particle, flake, small platelet, small ribbon, disc, or a combination thereof.

3. A process as defined in claim 1, wherein step (c), (e) and/or (f) further comprises an additional step of hardening said adhesive to help maintain the shape of individual layers.

4. A process as defined in claim 1, wherein step (c), (e) and/or (f) comprises sub-steps of (i) depositing a layer of reinforcement and adhesive to an initial layer thickness greater than said predetermined thickness, (ii) compressing said layer to said predetermined thickness, and (iii) hardening said adhesive to help maintain the shape of individual layers.

5. A process as defined in claim 1, wherein step (c), (e) and/or (f) comprises sub-steps of employing a reinforcement dispensing tool to deposit first-type reinforcement to first portion of an individual layer and employing the same or a different reinforcement dispensing tool to deposit second-type reinforcement to a second portion of said individual layer for forming a hybrid preform shape of multi-reinforcements.

6. A process as defined in claim 3, wherein said adhesive hardening step is promoted by using an energy source selected from a group consisting of ultra-violet light, infrared, microwave, Gamma radiation, laser, electron beam, ion beam and plasma.

7. A process as defined in claim 1, further comprising the steps of:

creating a geometry of said three-dimensional preform on a computer with said geometry including a plurality of segments defining the preform;

generating programmed signals corresponding to each of said segments in a predetermined sequence; and moving said material deposition device and said work surface relative to each other in response to said programmed signals.

8. A process as defined in claim 1, further comprising the steps of:

creating a geometry of said three-dimensional preform on a computer with said geometry including a plurality of segments defining the preform; each of said segments being coded with a selected reinforcement composition;

generating programmed signals corresponding to each of said segments in a predetermined sequence; and operating said material deposition device in response to said programmed signals to selectively dispense and deposit said adhesive and selected reinforcement compositions, one reinforcement composition at a time, while said material deposition device and said work surface are moved relative to each other in response to said programmed signals in said predetermined sequence.

9. A process as defined in claim 1, wherein said moving step includes the step of moving said material deposition device and said work surface relative to each other along selected directions on said X-Y plane according to a first predetermined pattern to form an outer boundary from selected reinforcement and adhesive compositions on said work surface, said outer boundary defining an exterior surface of said preform.

10. A process as defined in claim 9, wherein said outer boundary defines an interior space in said preform, and said moving step further includes the step of moving said material deposition device and said work surface relative to each other along selected directions on said X-Y plane according to at least one other predetermined pattern to fill said interior space with selected reinforcement and adhesive compositions.

11. A process as defined in claim 10, further comprising the steps of:

creating a geometry of said three-dimensional preform on a computer with said geometry including a plurality of segments defining the preform and each of said segments being coded with a selected reinforcement composition; and generating programmed signals corresponding to each of said segments in a predetermined sequence, wherein said programmed signals determine said movement of said material deposition device and said work surface relative to each other in said first predetermined pattern and said at least one other predetermined pattern.

12. A process as defined in claim 1, further comprising using dimension sensor means to periodically measure dimensions of the object being built; and using a computer to determine the thickness and outline of individual layers of said reinforcement and adhesive compositions in accordance with a computer aided design representation of said preform; said computing step comprising operating said computer to calculate a first set of logical layers with specific thickness and outline for each layer and then periodically re-calculate another set of logical layers after periodically comparing the dimension data acquired by said sensor means with said computer aided design representation in an adaptive manner.

13. A process as defined in claim 1, wherein said operation of a material deposition device includes the operation of a separate support material dispensing tool and wherein said process further comprises the steps of:

creating a geometry of said three-dimensional preform on a computer with said geometry including a plurality of segments defining the preform;

evaluating the data files representing said preform to locate any un-supported feature of the preform and, responsive to said evaluation step, determining a support structure for the un-supported feature and creating a plurality of segments defining said support structure;

generating programmed signals corresponding to each of said segments defining both said preform and said support structure in a predetermined sequence; and moving said material deposition device and said work surface relative to each other in response to said programmed signals for building said preform and said support structure.

14. A process as defined in claim 1, wherein said operation of a material deposition device includes the operation of a separate support material dispensing tool and wherein said process further comprises the steps of:

creating a geometry of said three-dimensional preform on a computer with said geometry including a plurality of segments defining the preform;

evaluating the data files representing said preform to locate any un-supported feature of the preform and, responsive to said evaluation step, determining a support structure for the un-supported feature and creating a plurality of segments defining said support structure; each of said segments for the preform being coded with a selected reinforcement composition and each of said segments for the support structure being coded with a support material composition;

generating programmed signals corresponding to each of said segments in a predetermined sequence;

operating said material deposition device in response to said programmed signals to selectively dispense and deposit said selected reinforcement, adhesive and support material compositions; and moving said material deposition device and said work surface relative to each other in response to said programmed signals for building said preform shape and said support structure.

15. Solid freeform fabrication apparatus for making a three-dimensional reinforcement preform shape, comprising:

(a) a material deposition device comprising a liquid adhesive dispensing tool that comprises (1) at least a flow channel being supplied with a hardenable liquid adhesive composition, (2) at least one nozzle having, on one end, a fluid passage in flow communication with said at least one channel and, on another end, a discharge orifice of a predetermined size, and (3) actuator means located in control relation to said channel for activating delivery of said liquid adhesive composition through said discharge orifice;

a reinforcement dispensing tool that comprises (1) at least a flow channel being supplied with a solid reinforcement composition, (2) at least one nozzle having, on one end, a flow passage in flow communication with said flow channel and, on another end, a discharge orifice of a predetermined size, and (3) valve means located in control relation with said flow channel;

(b) an object-supporting work surface at a predetermined initial distance from said discharge orifices to receive said liquid adhesive and reinforcement compositions therefrom;

(c) motion devices coupled to said work surface and said material deposition device for moving said material deposition device and said work surface relative to each other in a plane defined by first and second directions and in a third direction orthogonal to said plane to deposit said liquid adhesive and reinforcement compositions into a three-dimensional shape.

16. Apparatus as set forth in claim 15, wherein said liquid adhesive dispensing tool comprises a device selected from the group consisting of an ink jet print-head with thermally activated actuator means, an ink jet print-head with piezo-electrically activated actuator means, and an air gun with compressed air-powered actuator means.

17. Apparatus as set forth in claim 15, further comprising:
a computer-aided design computer and supporting software programs operative to create a three-dimensional geometry of a desired preform shape, to convert said geometry into a plurality of segments defining the shape, and to generate programmed signals corresponding to each of said segments in a predetermined sequence; and
a three-dimensional motion controller electronically linked to said computer and said motion devices and operative to actuate said motion devices in response to said programmed signals for each of said segments received from said computer.

18. Apparatus as set forth in claim 17, wherein said supporting software programs comprise:
means for evaluating the data files representing the geometry of said preform shape to locate any un-supported feature of the preform shape;
means, responsive to the evaluating means locating an un-supported feature, for defining a support structure for said un-supported feature;
means for creating a plurality of segments defining said support structure; and
means for generating programmed signals required by said material deposition device to fabricate said support structure.

19. Apparatus as set forth in claim 17, further comprising:
sensor means electronically linked to said computer and operative to periodically provide layer dimension data to said computer;
supporting software programs in said computer operative to perform adaptive layer slicing to periodically create a new set of layer data comprising segments defining the shape in accordance with said layer dimension data acquired by said sensor means, and to generate programmed signals corresponding to each of said segments in a predetermined sequence.

20. Apparatus as set forth in claim 15, further comprising compacting means coupled to said material deposition device for compacting the deposited reinforcement and adhesive composition.

21. Apparatus as set forth in claim 15, wherein said liquid adhesive composition is selected from the group consisting of photo-curable resins including laser-curable resins, microwave-curable resins, heat-curable resins, electron beam-curable resins, ion beam curable resins, plasma curable resins, and sol-gel compositions.

22. Apparatus as set forth in claim 15, wherein said liquid adhesive composition comprises an fast-vaporizing liquid.

23. Apparatus as set forth in claim 15 wherein said material deposition device comprises a support material deposition tool for building a support structure.

24. Apparatus as set forth in claim 15 wherein said reinforcement dispensing tool comprises a multi-channel pneumatic plug-phase delivery device comprising:
multiple particulate-supplying chambers;
pipe means in flow communication with said chambers to receive plugs of particulate material therefrom;
a supply of compressed air and valve means in control relation to said chambers and said pipe means to create said plugs of particulate material on demand in said pipe means;
a dispensing nozzle having, on one end, a flow passage in flow communication with said pipe means and, on another end, a discharge orifice of a predetermined size to dispense said particulate material therethrough.

25. A process for making multi-reinforcement a three-dimensional preform shape of spatially tailored material compositions, comprising the steps of
creating a geometry of said shape on a computer, said geometry including a plurality of segments defining said shape; each of said segments being coded with a specific reinforcement composition;
evaluating the geometry data files representing said shape to locate any un-supported feature of the shape, followed by defining a support structure for the un-supported feature and creating a plurality of segments defining said support structure;
generating program signals corresponding to each of said segments for both said preform shape and said support structure in a predetermined sequence;
providing a material deposition device capable of (a) dispensing a liquid adhesive composition, (b) dispensing, for each spatial location, a selected reinforcement composition for said shape, and (c) dispensing support material for building said support structure;
operating said material deposition device to deposit adhesive, reinforcement and support material compositions onto an object-supporting work surface;
during said deposition step, moving said material deposition device and said work surface in response to said programmed signals relative to each other in a plane defined by first and second directions and in a third direction orthogonal to said plane in a predetermined sequence of movements such that said material compositions are deposited in free space as a plurality of segments sequentially formed so that the last deposited segment overlies at least a portion of the preceding segment in contact therewith to thereby form said support structure and said multi-reinforcement three-dimensional preform shape.

26. A process as set forth in claim 1, further comprising additional step of impregnating said reinforcement preform with a solidifying matrix material to form a net-shape three-dimensional composite part.

27. A process as set forth in claim 25, further comprising additional step of impregnating said reinforcement preform with a solidifying matrix material to form a net-shape three-dimensional composite part.

28. A process as set forth in claim 1, further comprising additional steps of
(f) burning off at least partially said adhesive composition; and
(g) impregnating said reinforcement preform with a solidifying matrix material to form a net-shape three-dimensional composite part.

29. A process as set forth in claim 25, further comprising additional steps of
burning off at least partially said adhesive composition; and
impregnating said reinforcement preform with a solidifying matrix material to form a net-shape three-dimensional composite part.

* * * * *